United States Patent
Thadasina et al.

(10) Patent No.: US 7,558,222 B2
(45) Date of Patent: Jul. 7, 2009

(54) SYSTEM AND METHOD FOR SENDING IP PACKETS TO A MOBILE STATION TRANSITIONING FROM DORMANT STATE TO ACTIVE STATE

(75) Inventors: Nivedan Thadasina, Allen, TX (US); Rajeev Ramanath, Plano, TX (US); Rajasimann Vijayasimman, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 759 days.

(21) Appl. No.: 11/091,064

(22) Filed: Mar. 28, 2005

(65) Prior Publication Data

US 2005/0265277 A1    Dec. 1, 2005

Related U.S. Application Data

(60) Provisional application No. 60/575,610, filed on May 27, 2004.

(51) Int. Cl.
*H04L 12/16* (2006.01)
*H04Q 11/00* (2006.01)
*H04B 7/00* (2006.01)
*H04M 3/42* (2006.01)

(52) U.S. Cl. ............... 370/261; 370/260; 455/518; 455/519; 455/416

(58) Field of Classification Search ......... 370/260, 370/261, 390; 455/518, 519, 520, 415, 416, 455/571
See application file for complete search history.

(56) References Cited

U.S. PATENT DOCUMENTS

| 6,725,053 B2 * | 4/2004 | Rosen et al. ............ 455/518 |
| 7,170,863 B1 * | 1/2007 | Denman et al. ......... 370/260 |
| 2005/0220069 A1 * | 10/2005 | Li et al. ............. 370/349 |

* cited by examiner

*Primary Examiner*—George Eng
*Assistant Examiner*—Un C Cho

(57) ABSTRACT

A method for sending IP packets from a base station to a mobile station during transition of the mobile station from a dormant state to an active state is provided. The method includes receiving a lagging feature request from the mobile station. A physical layer of a traffic channel is established between the base station and the mobile station. A network layer of the traffic channel is established between the base station and the mobile station. After the physical layer of the traffic channel is established and while the network layer of the traffic channel is being established, the IP packets are packaged and sent to the mobile station in a particular format.

19 Claims, 4 Drawing Sheets

SYSTEM AND METHOD FOR SENDING IP PACKETS TO A MOBILE STATION TRANSITIONING FROM DORMANT STATE TO ACTIVE STATE

CROSS-REFERENCE TO RELATED APPLICATION AND CLAIM OF PRIORITY

The present invention is related to the invention disclosed in U.S. Patent Application Ser. No. 60/575,610, entitled "Technique to Reduce PTT Latency," filed on May 27, 2004. Patent Application Ser. No. 60/575,610 is assigned to the assignee of the present application. The subject matter disclosed in Patent Application Ser. No. 60/575,610 is hereby incorporated by reference into the present disclosure as if fully set forth herein.

TECHNICAL FIELD OF THE INVENTION

The present invention is directed in general to wireless telecommunications networks and, more specifically, to a method and system for communicating IP packets in a wireless network during transition of a mobile station from a dormant state to an active state.

BACKGROUND OF THE INVENTION

The use of cellular telephones and wireless networks has become increasingly widespread. As the use of cellular telephones has increased, the number and quality of additional features made available with the cellular telephones has also increased. For example, many cellular telephones now provide a "walkie-talkie" type of feature in which users may communicate with a selected person or group of people by pushing a button on the telephone. This feature is often referred to as "Push-To-Talk."

The Push-To-Talk (PTT) feature is useful for situations in which users want or need to communicate with the same person or group of people repeatedly but not continuously. For example, a group of people at a mall may desire to keep in touch with each other after they split up to shop separately. Using Push-To-Talk, one person may quickly contact another person or other people without having to make a conventional cellular phone call.

The parties involved must first establish a PTT service between their respective phones. The wireless network is then aware of the presence of each mobile station (e.g., cell phone) involved in the PTT service, although no traffic channels are set up. The mobile stations initially communicate with the base stations of the wireless network using only overhead control channels to establish the PTT service. The call originator only needs to press a button, wait for a beep (or a similar indicator), and then speak. Advantageously, many service providers do not charge these conversations against the users' allotted usage minutes for the cellular telephones.

Many conventional PTT services use Internet Protocol (IP) transport to provide PTT service. IP packets are transported between the wireless network and the originating and terminating mobile stations over a link (e.g., Radio Link Protocol) after traffic channels are set up. Immediately after the call originator pushes the button to initiate a PTT call, the wireless network verifies that the call terminating (or target) mobile station is still present on the network. If the target mobile station is still present, the wireless network sets up traffic channels on the originating and terminating mobile stations. The physical layers of the traffic channels enable the originating and target mobile stations to receive and send data frames.

Next, the wireless network establishes a Radio Link Protocol (RLP) link layer between the originating and target mobile stations. The RLP link transports the IP packets on top of the data frames of the physical layers of the traffic channels. Finally, the wireless network sends to the originating mobile station an authorization-to-talk message (e.g., a Flow Grant message). The Flow Grant message is sent in IP packets over the RLP link. When the originating mobile station receives the Flow Grant message, it emits the beep or other indicator that informs the user (i.e., call originator) that the user may begin speaking.

However, there may be some significant latency (i.e., delay period) between the time when the user pushes the button to start using the PTT service and the time when the user receives a beep that indicates the user may speak. This latency is related to the initial delay in setting up the physical layer of the traffic channel between the wireless network and the originating mobile station and the further delay of setting up the network layer (i.e., the RLP link) between the originating mobile station and the wireless network. As a result, conventional cellular telephones may have delays of more than one second between the time that the user pushes the button and the time that the beep is provided. Such a delay can become annoying to the user and detracts from the PTT service.

Therefore, there is a need in the art for an improved Push-to-Talk (PTT) service having a reduced latency. In particular, there is a need for an improved wireless network that reduces the latency in providing a Flow Grant message to a mobile station that originates a Push-to-Talk (PTT) service session.

SUMMARY OF THE INVENTION

In accordance with the present invention, a method and system for communicating IP packets in a wireless network during transition of a mobile station from a dormant state to an active state are provided that substantially eliminate or reduce disadvantages and problems associated with conventional methods and systems.

According to one embodiment of the present invention, a method for sending IP packets from a base station to a mobile station during transition of the mobile station from a dormant state to an active state is provided. According to an advantageous embodiment of the present invention, the method comprises the steps of: 1) receiving a lagging feature request from the mobile station; 2) establishing a physical layer of a traffic channel between the base station and the mobile station; 3) establishing a network layer of the traffic channel between the base station and the mobile station; and 4) after establishing the physical layer of the traffic channel and while establishing the network layer of the traffic channel, packaging the IP packets in a first message format and sending the IP packets in the first message format to the mobile station.

According to one embodiment of the present invention, the first message format comprises a short data burst format.

According to another embodiment of the present invention, the method further comprises the steps of: 1) determining whether the network layer has been established; and 2) when the network layer has been established, packaging the IP packets in a second message format and sending the IP packets in the second message format to the mobile station.

According to still another embodiment of the present invention, the first message format comprises a short data burst format and the second message format comprising a radio link protocol format.

According to yet another embodiment of the present invention, the method further comprises the step of buffering the IP packets while establishing the physical layer of the traffic channel.

According to a further embodiment of the present invention, the step of receiving a lagging feature request from the mobile station comprises the sub-step of receiving a push-to-talk event message from the mobile station.

According to a still further embodiment of the present invention, the IP packets comprise a flow grant message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
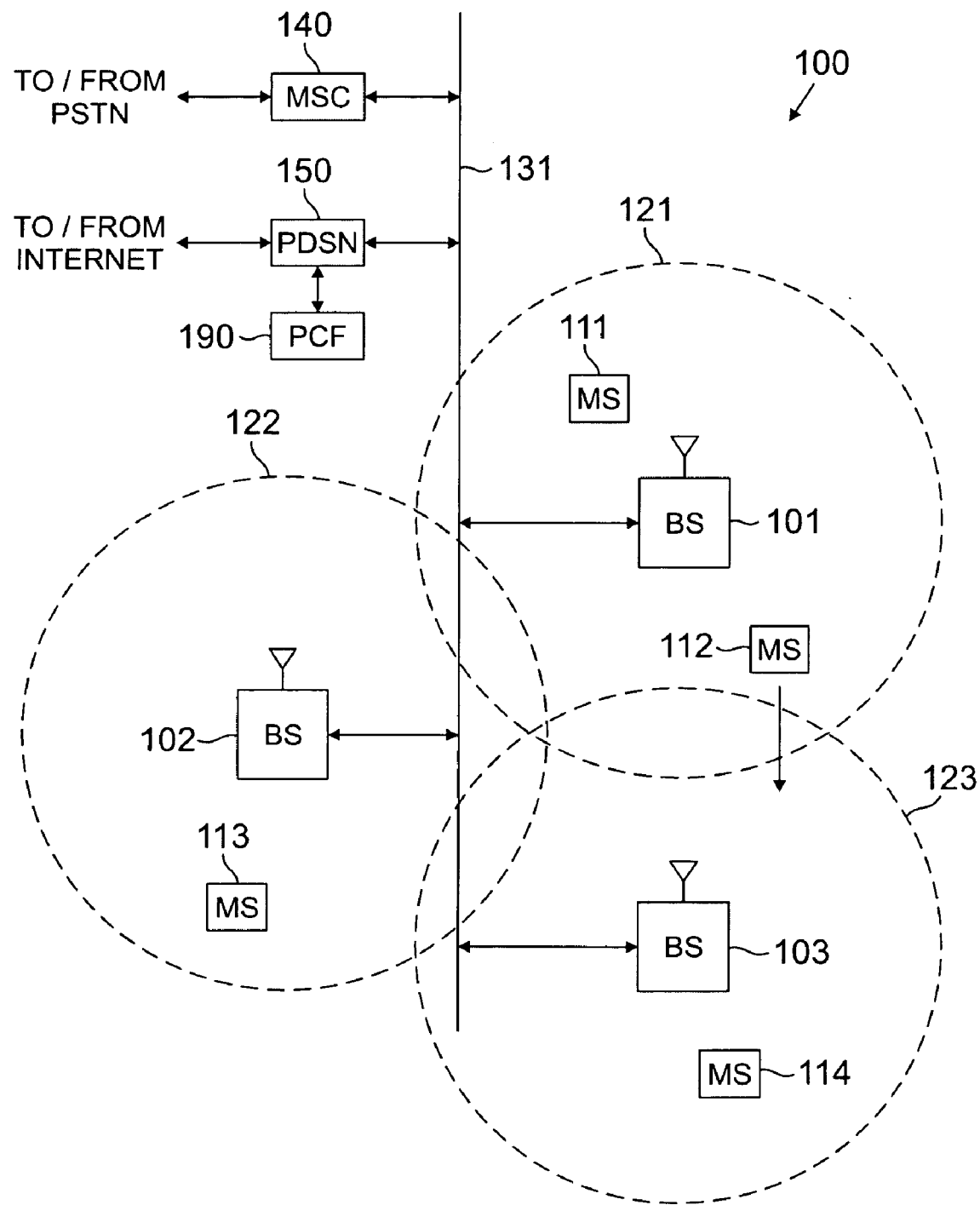
FIG. 1 illustrates an exemplary wireless network in which IP packets may be communicated to a mobile station during transition of the mobile station from a dormant state to an active state according to the principles of the present invention.

FIG. 1 illustrates exemplary wireless network 100, in which IP packets may be communicated to a mobile station during transition of the mobile station from a dormant state to an active state in accordance with principles of the present invention. The transition may occur, for example, when an originating mobile station initiates a Push-To-Talk (PTT) session with a terminating (or target) mobile station.

Wireless network 100 comprises a plurality of cell sites 121-123, each containing one of the base stations, BS 101, BS 102, or BS 103. In the exemplary embodiment, base stations 101-103 communicate with a plurality of mobile stations (MS) 111-114 over code division multiple access (CDMA) channels according to, for example, the IS-2000 standard (i.e., CDMA2000). In alternate embodiments, base stations 101-103 may communicate with mobile stations 111-114 according to other standards, such as GSM, OFDMA, or the like. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of the BSC, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, wireless network 100 and at least some of mobile stations 111-114 are operable to provide one or more lagging features for users of mobile stations 111-114. As used herein, a "lagging feature" is associated with a push-to-talk (PTT), push-to-view, push-to-all, or other suitable feature that is activated by the user of an originating mobile station. A delay is associated with providing the feature due to the time that elapses while the traffic channel is being established between the originating mobile station and a base station that serves the originating mobile station and during which the serving base station buffers any IP packets related to providing the feature for the originating mobile station.

For the purposes of simplicity and clarity in explaining the operation of the present invention, it shall be assumed in the following example that base station (BS) 101 of wireless network 100 provides the PTT service between mobile station (MS) 111 and mobile station (MS) 112. However, the descriptions that follow also apply to the remaining base stations and mobile stations in wireless network 100. MS 111 sends a PTT session message to BS 101 in order to initiate the establishment of a PTT session with MS 112. Thereafter, either MS 111 or MS 112 may act as an origination (or source) mobile station by sending a PTT event message to BS 101 in order to initiate a PTT event with terminating (or target) mobile station. In the example that follows, MS 111 is assumed to be the originating mobile station and MS 112 is assumed to be the terminating mobile station.

While a PTT session is established, MS 111 and MS 112 may communicate with BS 101 in any number of PTT events. A PTT event refers to communication using the PTT feature between mobile stations and base stations. After a PTT session is ended, another PTT session has to be established for the mobile stations 111 and 112 to communicate in subsequent PTT events. The PTT session message is operable to request that BS 101 establish a PTT session between MS 111 and MS 112 and others, if more than two mobile stations participate in the PTT session. Similarly, the PTT event message is operable to request that BS 101 establish a PTT event between MS 111 and MS 112. It will be understood that both the PTT session message and the PTT event message may actually comprise one or more communications between MS 111 and BS 101.

As described in more detail below, when a user requests the establishment of a PTT event, originating MS 111 transitions from a dormant state to an active state. MS 111 is in the dormant state when the common control channel, which is used by wireless network 100 in the downlink direction to notify MS 111 of an incoming call, is monitored and is in the active state when the traffic channel, which is used by wireless network 100 to transmit dedicated voice or data packets, is established. Thus, transition from the dormant state to the active state occurs when MS 111 is in the process of establishing the traffic channel but the traffic channel is not completely established yet.

During this transition, MS 111 is operable to receive messages from BS 101 in a first message format. After the transition, MS 111 is operable to receive messages from BS 101 in a second message format. While MS 111 is in transition, BS 101 buffers any IP packet(s) for MS 111, including a Flow Grant message, and sends the IP packet(s) to MS 111 in the first message format once the physical layer of the traffic channel is established, instead of continuing to buffer the IP packet(s) until the network layer (e.g., RLP link) is established and then sending the IP packets in the second message format. In this way, the Flow Grant message, which is operable to notify the user of MS 111 that the PTT session may begin, may be sent to MS 111 more quickly.

Figure 2:
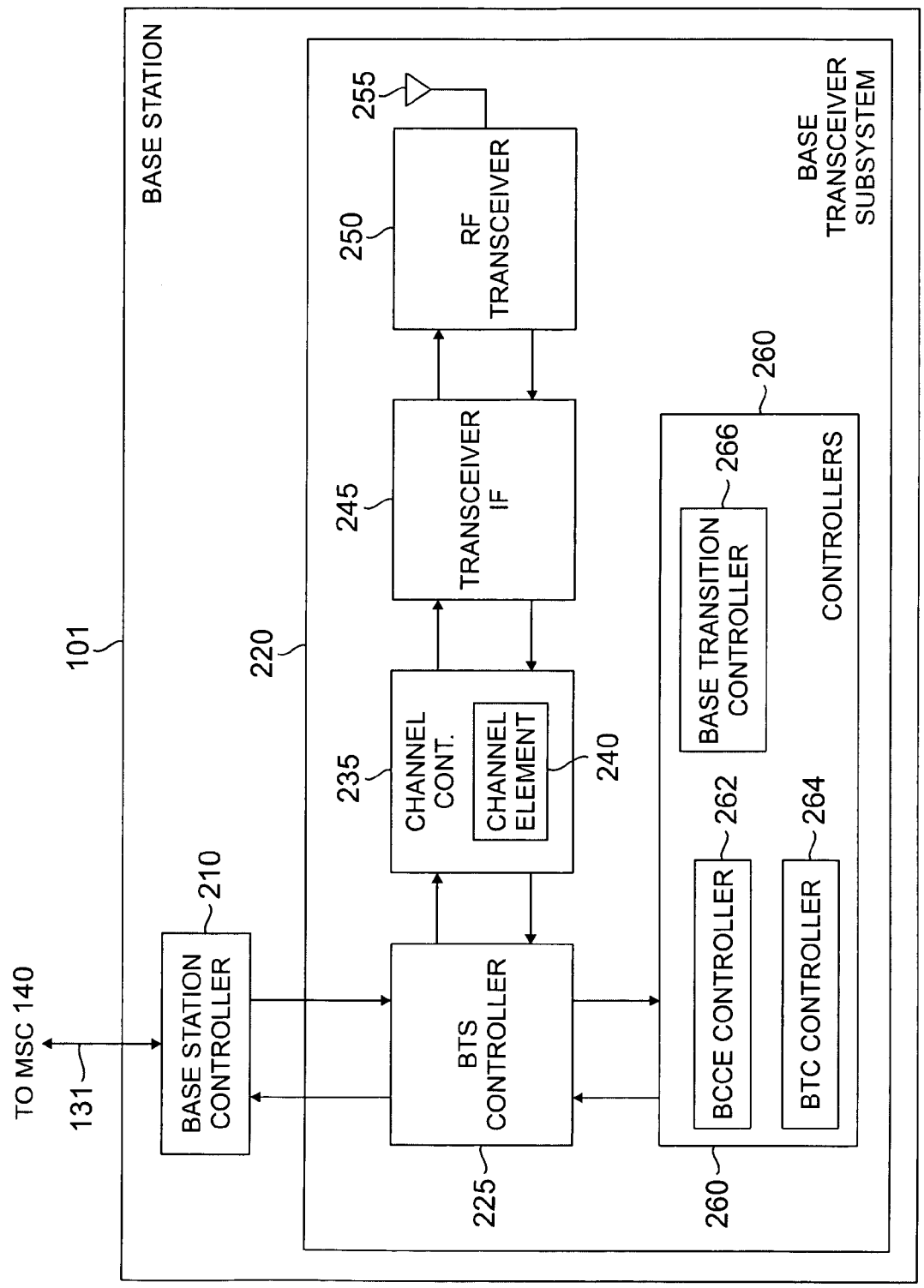
FIG. 2 illustrates an exemplary base station that reduces latency according to the principles of the present invention.

FIG. 2 illustrates base station 101, which reduces latency according to the principles of the present invention. Base station (BS) 101 comprises base station controller (BSC) 210 and at least one base transceiver subsystem (BTS) 220, as previously described in connection with FIG. 1. Base station controller 210 manages the resources in cell site 121, including base transceiver subsystem 220. According to one embodiment, base transceiver subsystem 220 comprises base transceiver subsystem (BTS) controller 225, channel controller 235 (which may comprise at least one channel element 240), transceiver interface (IF) 245, radio frequency (RF) transceiver unit 250, antenna array 255, and a set of additional controllers 260.

BTS controller 225 may comprise processing circuitry and memory capable of executing an operating program that controls the overall operation of base transceiver subsystem 220 and communicates with base station controller 210. Under normal conditions, BTS controller 225 directs the operation of channel controller 235, which may comprise a number of channel elements, such as channel element 240, that are each operable to perform bidirectional communication in the forward channel and the reverse channel. A "forward channel" refers to outbound signals from the base station 101 to mobile stations 111 and 112 and a "reverse channel" refers to inbound signals from mobile stations 111 and 112 to base station 101. Transceiver IF 245 transfers bidirectional channel signals between channel controller 240 and RF transceiver unit 250.

Antenna array 255 transmits forward channel signals received from RF transceiver unit 250 to mobile stations in the coverage area of base station 101. Antenna array 255 is also operable to send to RF transceiver unit 250 reverse channel signals received from mobile stations in the coverage area of the base station 101. According to one embodiment of the present invention, antenna array 255 comprises a multi-sector antenna, such as a three-sector antenna in which each antenna sector is responsible for transmitting and receiving in a coverage area corresponding to an arc of approximately 120°. Additionally, RF transceiver unit 250 may comprise an antenna selection unit to select among different antennas in antenna array 255 during both transmit and receive operations.

For the illustrated embodiment, controllers 260 comprise base common control channel (BCCC) controller 262, base traffic channel (BTC) controller 264, and base transition controller 266. It should be noted that in alternate embodiment of the present invention, base traffic channel (BTC) controller 264 and base transition controller 266 may be implemented in BSC 210. BCCC controller 262 is operable to control communications between base station 101 and mobile station 111 and 112 over the common control channels. BTC controller 264 is operable to control communications between base station 101 and mobile stations 111 and 112 over the traffic channels. Base transition controller 266 is operable to control the communication of IP packets between base station 101 and mobile station 111 over the traffic channel during transition of MS 111 from the dormant state to the active state. Although illustrated separately, it will be understood that the functionality of controllers 262, 264 and 266 may be implemented in a single component without departing from the scope of the present invention.

BCCC controller 262 is operable to provide communication with MS 111 using a first message format and BTC controller 264 is operable to provide communication with MS 111 using a second message format. Base transition controller 266 is operable to provide communication with MS 111 during transition of mobile station 111 from the dormant state to the active state using the first message format.

For one embodiment, base transition controller 266 is operable to buffer IP packets until the physical layer of the traffic channel has been established and to provide communication of IP packets between base station 101 and mobile station 111 after the physical layer of the traffic channel has been established but before the network layer of the traffic channel has been established. Once the network layer is established, BTC controller 264 begins providing communication using the second message format. For one embodiment, the first message format comprises a short data burst (SDB) format and the second message format comprises a radio link protocol (RLP) format.

Figure 3:
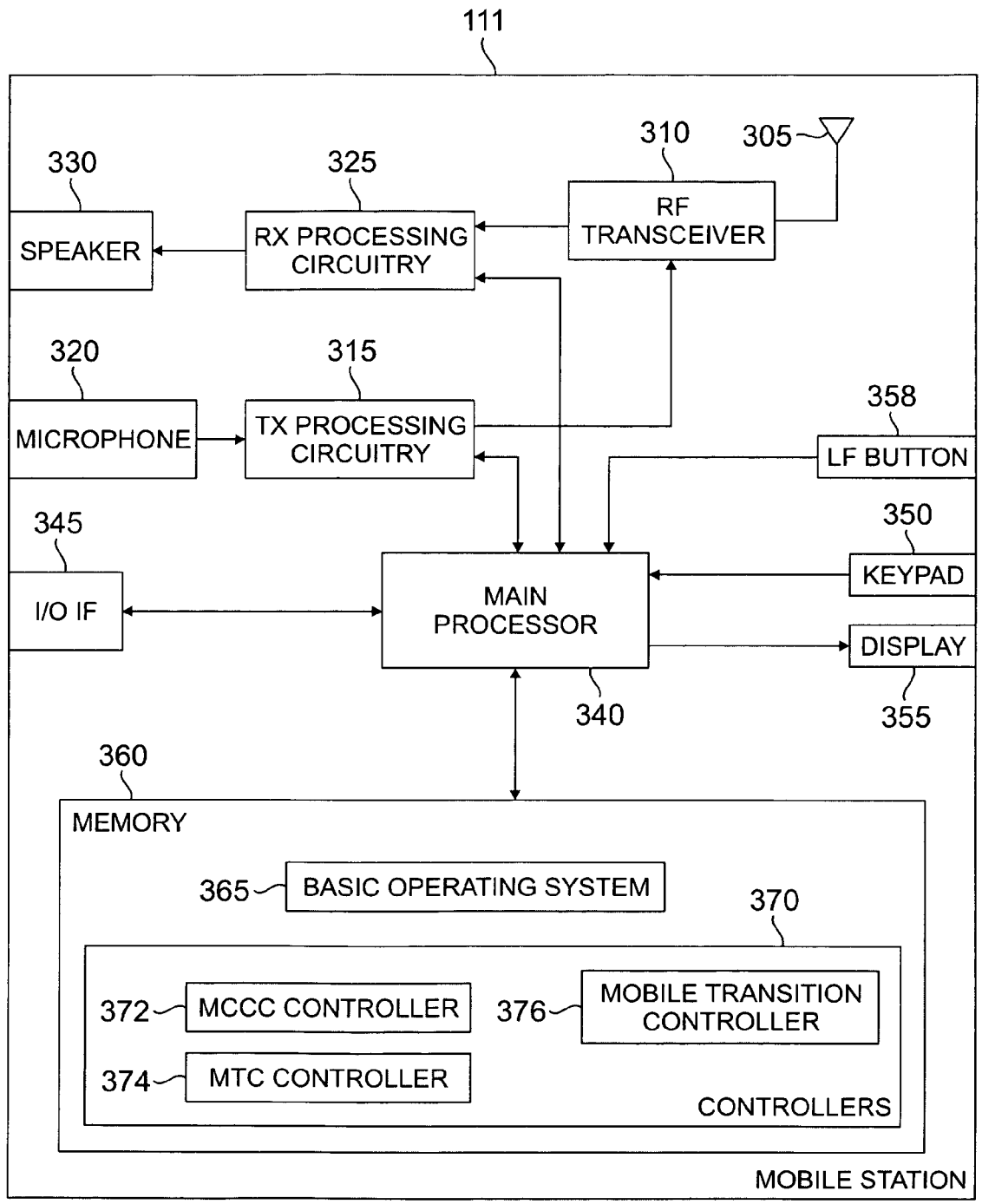
FIG. 3 is a block diagram illustrating one of the mobile stations of FIG. 1 in greater detail in accordance with one embodiment of the present invention.

FIG. 3 illustrates mobile station 111 in greater detail according to one embodiment of the present invention. Mobile station (MS) 111 is illustrated by way of example only. However, it will be understood that the components illustrated and described with respect to MS 111 are also part of mobile stations 112-114. MS 111 comprises antenna 305, radio frequency (RF) transceiver 310, transmit (TX) processing circuitry 315, microphone 320, receive (RX) processing circuitry 325, and speaker 330. MS 111 also comprises main processor 340, input/output (I/O) interface (IF) 345, keypad 350, display 355, lagging feature (LF) button 358, and memory 360.

RF transceiver 310 receives from antenna 305 an incoming RF signal transmitted by BS 101. RF transceiver 310 down-converts the incoming RF signal to produce an intermediate frequency (IF) or a baseband signal. The IF or baseband signal may be sent to receiver processing circuitry 325, which produces a processed baseband signal by filtering, decoding, and/or digitizing the baseband or IF signal. Receiver processing circuitry 325 is also operable to transmit the processed baseband signal to speaker 330 (e.g., when the processed baseband signal comprises voice data) or to main processor 340 for further processing (e.g., when the processed baseband signal relates to web browsing).

Transmitter processing circuitry 315 receives analog or digital voice data from microphone 320 or other outgoing baseband data (e.g., web data, e-mail, interactive video game data and the like) from main processor 340. Transmitter processing circuitry 315 encodes, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a read-only memory (ROM). Main processor 340 executes basic operating system program 365 stored in memory 360 in order to control the overall operation of mobile station 111. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs resident in memory 360. Main processor 340 may move data into or out of memory 360, as required by an executing process.

Memory 360 further comprises a plurality of controllers 370. In the exemplary embodiment, controllers 370 may comprise mobile common control channel (MCCC) controller 372, mobile traffic channel (MTC) controller 374, and mobile transition controller 376. MCCC controller 372 controls communications between mobile station 111 and base station 101 over the common control channel. MTC controller 374 controls communications between mobile station 111 and base station 101 over the traffic channel. Mobile transition controller 376 controls the communication of IP packets between mobile station 111 and base station 101 over the traffic channel during transition of mobile station 111 from the dormant state to the active state.

MCCC controller 372 provides communication with base station 101 using a first message format and MTC controller 374 provides communication with base station 101 using a second message format. Mobile transition controller 376 provides communication with base stations 101 during transition of mobile station 111 from a dormant state to an active state using the first message format.

In one embodiment of the present invention, mobile transition controller 376 may buffer IP packets until the physical layer of the traffic channel has been established and to provide communication of IP packets between base station 101 and mobile station 111 after the physical layer of the traffic channel has been established but before the network layer of the traffic channel has been established. Once the network layer (e.g., PRL link) is established, MTC controller 374 begins providing communication using the second message format. In another embodiment of the present invention, mobile transition controller 376 buffers IP packets until the traffic channel is completely established. At that point, MTC controller 374 communicates the IP packets to base station 101 using the second message format. In an advantageous embodiment of the present invention, the first message format comprises an SDB format and the second message format comprises an RLP format.

Main processor 340 is also coupled to the I/O interface 345. I/O interface 345 provides mobile station 111 with the ability to connect to other devices, such as laptop computers, hand-held computers and the like. I/O interface 345 provides a communication path between these accessories and main controller 340. Main processor 340 is also coupled to keypad 350 and display unit 355. The operator of mobile station 111 may use keypad 350 to enter data into mobile station 111. Display 355 may comprise a liquid crystal display capable of rendering text and/or graphics from websites. It will be understood that additional embodiments may use other types of displays.

Main processor 340 is also coupled to lagging feature button 358. Lagging feature button 358 comprises a button or other suitable structure that may be pushed or otherwise selected in order to activate a lagging feature, such as the PTT feature. In addition, lagging feature button 358 may be used to operate the lagging feature. For example, for the PTT feature, lagging feature button 358 may be pushed to initiate the establishment of a PTT event and, once the PTT event is established, may be pushed to talk and released to listen. It will be understood that lagging feature button 358 may comprise a plurality of buttons or other suitable structures, each of which may be operable to activate a different lagging feature. Furthermore, it will be understood that, instead of comprising a separate structure, lagging feature button 358 may be implemented as part of keypad 350 or another structure.

Figure 4:
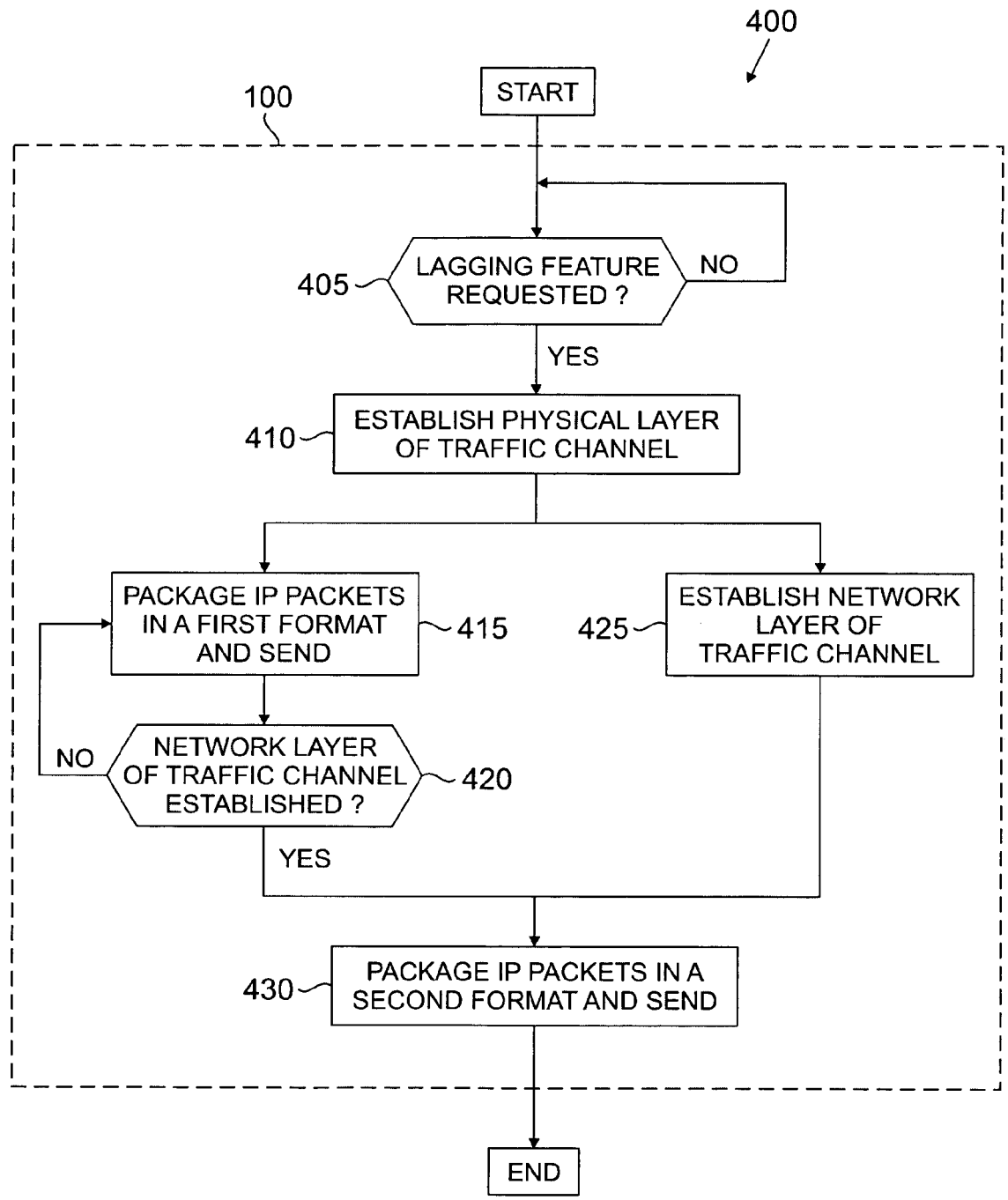
FIG. 4 is a flow diagram illustrating a method for communicating IP packets during transition of a mobile station from dormant to active in accordance with one embodiment of the present invention.

FIG. 4 depicts flow diagram 400, which illustrates a method for communicating IP packets in wireless network 100 during transition of mobile station 111 from dormant to active in accordance with one embodiment of the present invention. Initially, BS 101 determines whether MS 111, which has been in a dormant state, has requested a lagging feature, resulting in the initiation of a transition from the dormant state to an active state. This may include, for example, BS 101 receiving a PTT event message from MS 111 that indicates that the user of MS 111 wants to begin talking to MS 112 in a PTT event based on a previously established PTT session (process step 405). If MS 111 has not requested a lagging feature, the method follows the NO branch and remains at step 405 where BS 101 continues to monitor MS 111 for an indication that MS 111 has requested a lagging feature.

If MS 111 has requested a lagging feature, BS 101 establishes the physical layer of the traffic channel (process step 410). After establishment of the physical layer of the traffic channel, MS 111 can send data frames to, and receive data frames from BS 101. It will be understood that BS 101 may perform additional steps before, during or after setting up the physical layer of the traffic channel other than those described in connection with FIG. 4 in order to provide the requested lagging feature. For example, if any IP packets are received for MS 111, BS 101 may buffer the IP packets while the physical layer of the traffic channel is being established.

At this point, BS 101 may conduct two processes in parallel. BS 101 may transmit data to MS 111 over the frames of the physical layer of the traffic channel, while BS 101 simultaneously continues to set up a network layer (e.g., RLP link) for transporting IP packets to MS 111. Thus, in one process, BS 101 packages any IP packets destined for MS 111 in a first message format and sends the IP packets to MS 111 (process step 415). BS 101 then checks to see if the network layer of the traffic channel has been established with MS 111 (process step 420). At the same time, in the second process, BS 101 continues to establish the network layer of the traffic channel (process step 425). Finally, when the network layer has been established, BS 101 packages IP packets in a second format and sends the IP packets over the network layer (process step 430).

In an exemplary embodiment, base transition controller 266 packages and sends the IP packets in the first message format prior to the set up of the network layer. In the of example of the PTT service, BS 101 may send an IP packet containing a Flow Grant message to MS 111 in a short data burst (SDB) message as soon as the traffic channel is set up, but before an RLP link (i.e., the network layer) is set up between MS 111 and BS 101.

At that point, MS 111 may emit a beep and the user may begin to speak. The voice data is temporarily buffered in MS 111 while BS 101 and MS 111 continue to set up the RLP link. Once the network layer is established, MS 111 transmits the buffered voice data in IP packets over the RLP link to BS 101, which forwards the IP packets to MS 112. In this manner, BS 101 is able to provide a Flow Grant to MS 111 with less latency and the user of MS 111 may begin speaking sooner.

Although the present invention has been described with an exemplary embodiment, various changes and modifications may be suggested to one skilled in the art. It is intended that the present invention encompass such changes and modifications as fall within the scope of the appended claims.

What is claimed is:

1. A method for sending IP packets from a base station to a mobile station during transition of the mobile station from a dormant state to an active state, the method comprising the steps of:
   receiving a lagging feature request from the mobile station;
   establishing a physical layer of a traffic channel between the base station and the mobile station;
   establishing a network layer of the traffic channel between the base station and the mobile station; and
   after establishing the physical layer of the traffic channel and while establishing the network layer of the traffic channel, packaging the IP packets in a first message format and sending the IP packets in the first message format to the mobile station, wherein the IP packets comprise a flow grant message, and wherein the flow grant message is buffered at the base station until the physical layer of the traffic channel between the mobile station and the base station is established.

2. The method as set forth in claim 1, wherein the first message format comprises a short data burst format.

3. The method as set forth in claim 1, further comprising the steps of:
   determining whether the network layer has been established; and
   when the network layer has been established, packaging the IP packets in a second message format and sending the IP packets in the second message format to the mobile station.

4. The method as set forth in claim 3, wherein the first message format comprises a short data burst format and the second message format comprising a radio link protocol format.

5. The method as set forth in claim 1, further comprising the step of buffering the IP packets while establishing the physical layer of the traffic channel.

6. The method as set forth in claim 1, wherein the step of receiving a lagging feature request from the mobile station comprises the sub-step of receiving a push-to-talk event message from the mobile station.

7. The method as set forth in claim 1, wherein the first message format comprises a short data burst format.

8. A method for establishing a push-to-talk (PTT) event for an originating mobile station and a target mobile station, the method comprising the steps of:

sending a PTT event message from the originating mobile station to a first base station;

receiving a flow grant message from the first base station at the originating mobile station before a network layer of a traffic channel between the originating mobile station and the first base station is established; and providing notification to a user of the originating mobile station that the flow grant message has been received, wherein the flow grant message is buffered at the first base station until a physical layer of the traffic channel between the originating mobile station and the first base station is established.

9. The method as set forth in claim 8, wherein the step of receiving the flow grant message from the first base station at the originating mobile station comprise the sub-step of receiving the flow grant message in a short data burst format.

10. The method as set forth in claim 8, further comprising the step of initiating the PTT event message at the originating mobile station.

11. The method as set forth in claim 10, wherein the step of initiating the PTT event message at the originating mobile station comprises the sub-step of receiving an indication that a lagging feature button has been pushed by the user of the originating mobile station.

12. The method as set forth in claim 8, further comprising the steps of:

establishing a physical layer of the traffic channel between the first base station and the originating mobile station;

establishing the network layer of the traffic channel between the first base station and the originating mobile station;

while establishing the network layer of the traffic channel, sending the IP packets to the first base station in a first message format; and when the network layer has been established, packaging the IP packets in a second message format and sending the IP packets in the second message format to the first base station.

13. The method as set forth in claim 12, wherein the first message format comprises a short data burst format and the second message format comprises a radio link protocol format.

14. The method as set forth in claim 12, wherein the first message format comprises a short data burst format.

15. A wireless network comprising a plurality of base stations capable of providing Push-to-Talk (PTT) service between a plurality of mobile stations, wherein said wireless network is capable of receiving from a first one of said plurality of mobile stations a request to send a PTT message to a second one of said plurality of mobile stations, and wherein said wireless network, in response to said request, is further capable of establishing a physical layer of a traffic channel between said first mobile station and a first one of said plurality of base stations and transmitting an authorization message from said first base station to said first mobile station in data frames of said physical layer of said traffic channel, wherein said authorization message comprises a flow grant message, and wherein the flow grant message is buffered at said first base station until the physical layer of the traffic channel between said first mobile station and the first base station is established.

16. The wireless network as set forth in claim 15, wherein said wireless network transmits said authorization message to said first mobile station in data frames of said physical layer of said traffic channel prior to establishment of a network layer link in said traffic channel between said first mobile station and said first base station.

17. The wireless network as set forth in claim 16, wherein said wireless network transmits said authorization message to said first mobile station in said data frames of said physical layer of said traffic channel in a short data burst format.

18. The wireless network as set forth in claim 17, wherein said network layer link comprises radio link protocol (RLP) link.

19. The wireless network as set forth in claim 18, wherein said wireless network is further capable of verifying that said second mobile station is capable of communicating with a second one of said plurality of base station prior to transmitting said authorization message from said first base station to said first mobile station in said data frames of said physical layer of said traffic channel.

* * * * *